US012188278B2

(12) United States Patent
Bernhagen

(10) Patent No.: US 12,188,278 B2
(45) Date of Patent: Jan. 7, 2025

(54) SLIDE MECHANISM FOR FENESTRATION UNIT AND ASSOCIATED METHODS

(71) Applicant: Pella Corporation, Pella, IA (US)

(72) Inventor: Todd A. Bernhagen, Pella, IA (US)

(73) Assignee: Pella Corporation

(*) Notice: Subject to any disclaimer, the term of this patent is extended or adjusted under 35 U.S.C. 154(b) by 0 days.

(21) Appl. No.: 18/344,597

(22) Filed: Jun. 29, 2023

(65) Prior Publication Data

US 2023/0340824 A1 Oct. 26, 2023

Related U.S. Application Data

(63) Continuation-in-part of application No. 17/325,070, filed on May 19, 2021, now Pat. No. 11,725,446.

(60) Provisional application No. 63/070,156, filed on Aug. 25, 2020.

(51) Int. Cl.
*E05F 11/06* (2006.01)
*E05F 11/16* (2006.01)

(52) U.S. Cl.
CPC .............. *E05F 11/06* (2013.01); *E05F 11/16* (2013.01); *E05Y 2900/148* (2013.01)

(58) Field of Classification Search
CPC ......... E05F 11/06; E05F 11/16; E05F 11/485; E05F 11/486; E06B 3/325; E05Y 2900/148
See application file for complete search history.

(56) References Cited

U.S. PATENT DOCUMENTS

| | | | |
|---|---|---|---|
| 7,971 | A | 3/1851 | Guyer |
| 32,765 | A | 7/1861 | Gibbs |
| 38,579 | A | 5/1863 | Gibbs |
| 43,503 | A | 7/1864 | Hubert |
| 62,635 | A | 3/1867 | Judd |
| 88,179 | A | 3/1869 | Judd |
| 98,209 | A | 12/1869 | Turner |
| 98,508 | A | 1/1870 | Lovejoy |
| 114,494 | A | 5/1871 | Turner |
| 114,825 | A | 5/1871 | Johnson |
| 118,253 | A | 8/1871 | Lull |
| 134,812 | A | 1/1873 | Ludlow |
| 135,561 | A | 2/1873 | Judd |
| 135,950 | A | 2/1873 | Traphagen |
| 137,450 | A | 4/1873 | Judd |
| 155,379 | A | 9/1874 | Judd |
| 235,169 | A | 12/1880 | Rancevau |
| 255,361 | A | 3/1882 | Werneth |
| 319,298 | A | 6/1885 | Moore |
| 3,894,441 | A | 7/1975 | Falkenberg |

(Continued)

*Primary Examiner* — Justin B Rephann
(74) *Attorney, Agent, or Firm* — FAEGRE DRINKER BIDDLE & REATH

(57) ABSTRACT

Fenestration units that include slide mechanisms that operate the unit through linear motion. Slide mechanism designs include a handle, a slide member coupled to the handle, and a linear rail along which the slide member is slidably received such that the slide member is operable to slide in a linear motion. The slide member includes an attachment structure for operatively coupling with a drive belt to transfer linear motion through a transfer mechanism to a drive mechanism of the unit. The attachment structure is attached to the drive belt such that a position of the attachment mechanism along the length of the drive belt may be adjusted by a user.

10 Claims, 21 Drawing Sheets

(56) References Cited

U.S. PATENT DOCUMENTS

| | | | | |
|---|---|---|---|---|
| 4,440,354 | A | 4/1984 | Kobayashi et al. | |
| 4,662,236 | A | 5/1987 | Kobayashi | |
| 4,813,304 | A | 3/1989 | Kobayashi | |
| 4,969,859 | A | 11/1990 | Holbrook | |
| 5,144,770 | A * | 9/1992 | Kraus | E05F 11/48 49/362 |
| 5,502,925 | A * | 4/1996 | Gorrell | E05D 13/1207 49/449 |
| 5,687,506 | A | 11/1997 | Davies et al. | |
| 6,267,168 | B1 | 7/2001 | Davies et al. | |
| 6,328,090 | B1 * | 12/2001 | Anderson | E06B 9/264 160/84.05 |
| 7,824,286 | B2 | 11/2010 | Schmid et al. | |
| 10,676,977 | B2 * | 6/2020 | Erickson | E05F 11/16 |
| 10,876,343 | B2 * | 12/2020 | Erickson | E05F 11/16 |
| 11,480,001 | B2 * | 10/2022 | Erickson | E06B 3/325 |
| 11,725,446 | B2 | 8/2023 | Bernhagen | |
| 11,982,118 | B2 * | 5/2024 | Erickson | E05F 11/16 |
| 2001/0027621 | A1 | 10/2001 | Davies et al. | |
| 2006/0130980 | A1 * | 6/2006 | Gromotka | E06B 9/264 160/107 |
| 2006/0169418 | A1 * | 8/2006 | Gromotka | E06B 9/54 160/107 |
| 2018/0163450 | A1 * | 6/2018 | Erickson | E05F 11/16 |
| 2018/0163451 | A1 * | 6/2018 | Erickson | E05F 11/10 |
| 2022/0065018 | A1 | 3/2022 | Bernhagen | |

* cited by examiner

SLIDE MECHANISM FOR FENESTRATION UNIT AND ASSOCIATED METHODS

CROSS-REFERENCE TO RELATED APPLICATIONS

The present application is in Continuation of U.S. Non-Provisional application Ser. No. 17/325,070, filed May 19, 2021, and further claims priority to U.S. Provisional Application 63/070,156, filed Aug. 25, 2020, the contents of which are incorporated herein by reference.

FIELD

The present disclosure relates generally to fenestration units. In particular, the disclosure relates to slide operator assemblies and components for fenestration units.

BACKGROUND

Casement windows have a sash that is attached to a frame by one or more hinges at a side of the frame, or window jamb. Window sashes hinged at the top, or head of the frame, are referred to as awning windows, and sashes hinged at the bottom, or sill of the frame, are called hopper windows. Any of these configurations may be referred to simply as hinged fenestration units, or pivoting fenestration units.

Typically, such hinged fenestration units are opened by simply pushing on the sash directly, or through the use of hardware including cranks, levers, or cam handles. In various examples, operators are placed around hand height or at the bottom/sill of the unit. Such operators typically require a user to impart a swinging or rotational motion with some form of crank handle. This type of operator hardware may have one or more undesirable traits for some hinged fenestration unit designs, including requisite location (e.g., sill, interiorly protruding), associated appearance (e.g., crank style), or form of operability (e.g., rotating/cranking/swinging).

SUMMARY

Various examples from this disclosure relate to sliding operator assemblies and associated fenestration units, systems, components and methods of use and assembly. Some aspects relate to sliding operator assemblies that transition a first, linear actuation force along a first axis (e.g., vertical) to a second actuation force along a second axis (e.g., horizontal) that is angularly offset from the first axis to cause a drive mechanism to impart opening and closing forces, respectively, on the sash. Examples include belt-, twisted wire-, or band-drive sliding operator assemblies. Various concepts described in this patent specification address tensioners for such sliding operator assemblies. Advantages include the ability to provide tension in linear operator assemblies suitable for use in fenestration units of different styles (e.g., casement, awning, and others) in a relatively compact, and adjustable tensioner assembly.

Some examples relate to a tensioner for a fenestration unit operator, the tensioner including a sled, a guide, and a pulley. The sled includes a base, and the guide includes a track, the track slidably receiving the base such that the base is restricted to sliding in a first direction with respect to the guide along a sliding axis and a second direction with respect to the guide along the sliding axis that is opposite to the first direction. The tensioner also includes a pawl and a ratchet each being a part of one of the sled and the guide, respectively. The pawl is in biased engagement with the ratchet to permit sliding in the first direction and restrict sliding in the second direction. The pawl is configured to be manually disengaged from the ratchet to permit sliding in the second direction. The pulley is coupled to the sled such that the pulley is free to rotate about a rotational axis that is transverse to the sliding axis. In some embodiments, the pawl is part of the sled, and the ratchet is part of the guide.

Some examples relate to a fenestration unit that includes the tensioner and the fenestration unit operator. For example, the fenestration unit optionally includes a frame and a panel hinged to the frame such that the panel is pivotable between an open position and a closed position. The operator assembly is operable for actuating the panel between the open and closed positions, the operator assembly including a drive belt and a drive mechanism, the drive belt being tensioned to the drive mechanism by the tensioner with the pulley of the tensioner receiving the drive belt.

Some examples relate to a method of tensioning an operator assembly operable for actuating a panel of a fenestration unit between an open position and a closed position, the operator assembly including a drive belt and a drive mechanism, the drive belt being tensioned to the drive mechanism by a tensioner, the tensioner including a sled and a guide slidably receiving the track and the drive belt being coupled to the sled, the method comprising indexing the sled relative to the guide in a first, tensioning direction to tension the drive belt to the drive mechanism.

The foregoing Examples are just that and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 12 is an isometric view, FIG. 13 is an end-view, FIG. 14 is an elevation view, and FIG. 15 is a plan view thereof, according to some embodiments.

DETAILED DESCRIPTION

Definitions and Terminology

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only. For example, words such as "top", "bottom", "upper," "lower," "left," "right," "horizontal," "vertical," "upward," and "downward" merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

The section headers in the description below are not meant to be read in a limiting sense, nor are they meant to segregate the collective disclosure presented below. The disclosure should be read as a whole. The headings are simply provided to assist with review, and do not imply that discussion outside of a particular heading is inapplicable to the portion of the disclosure falling under that heading.

DESCRIPTION OF VARIOUS EMBODIMENTS

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale.

Figure 1:
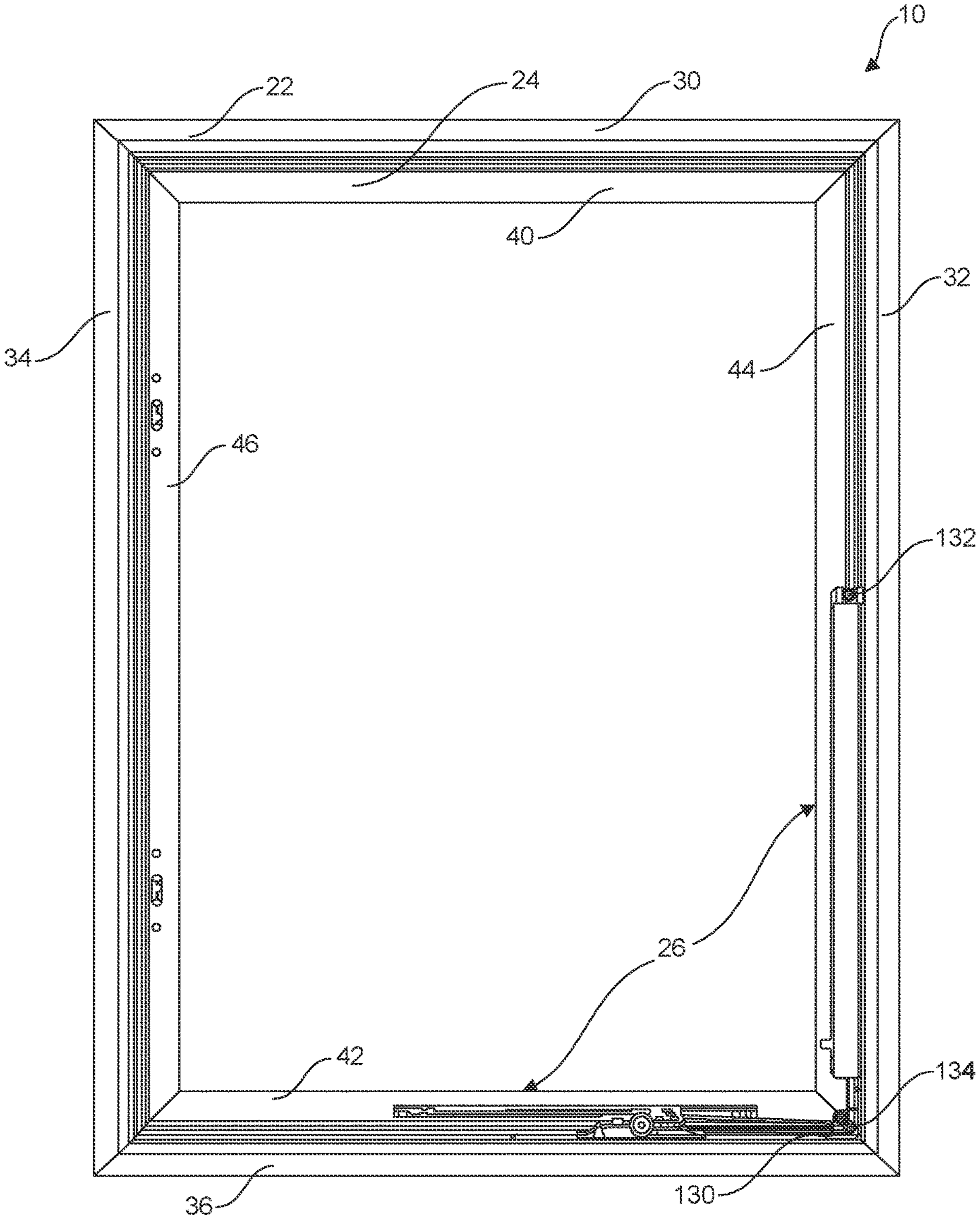
FIG. 1 is a front view of a fenestration unit, from an interior-facing side of the fenestration unit, according to some embodiments.

FIG. 1 is a front view of a fenestration unit 10, from an interior-facing side of the fenestration unit 10, according to some examples. As shown, the fenestration unit 10 includes a frame 22, a sash 24 hinged to the frame 22 such that the sash 24 is pivotable or otherwise movable (e.g., through a pivoting and swinging motion) between an open position and a closed position, and an operator assembly 26 operable to transition the sash 24 between the open and closed positions.

The frame 22 and sash 24 may be any of a variety of styles and designs, including casement-, awning-, or hopper-styles as previously described. In the example of FIG. 1, the frame 22 and sash 24 are configured in the casement-style arrangement. It should also be understood that the casement example of FIG. 1 can be rotated (e.g., clockwise) by 90 degrees to present an awning window configuration and the operator assembly 26 can be adjusted in configuration as desired to facilitate operation in an awning-style configuration. Examples of suitable window frames and sashes that may be modified for use with the operator assembly 26 include those commercially available from Pella Corporation of Pella, IA under the tradename "IMPERVIA," although any of a variety of designs are contemplated.

In the view of FIG. 1, the interior jamb covering, or millwork is missing for ease of visualizing the operator assembly 26 and its operative assembly with the remainder of the fenestration unit 10. As shown, the frame 22 has a head 30, a first jamb 32, a second jamb 34, and a sill 36. The sash 24 has a top rail 40, a bottom rail 42, a first stile 44 and a second stile 46. Glazing (e.g., an IG unit) is supported by the rails and stiles. Though not shown, a latch assembly, including a handle, or other features may be located on a side of the frame 22 (e.g., on second jamb 34) for locking the sash 24 in the closed position with respect to the frame 22 and unlocking the sash to permit the sash to be moved between the closed and open positions through use of the operator assembly 26. When the fenestration unit 10 is in a closed configuration, the maximum viewing area presented through the fenestration unit 10 generally corresponds to the central area defined by the rails and stiles, unless some non-transparent feature of the glazing projects inwardly of the stiles and rails. As referenced above, in some examples the configuration of the operator assembly 26 helps avoid unnecessary protrusion into, or impingement of, the viewing area or other sightlines associated with the fenestration unit 10 (e.g., as compared to traditional crank handle designs).

Figure 2:
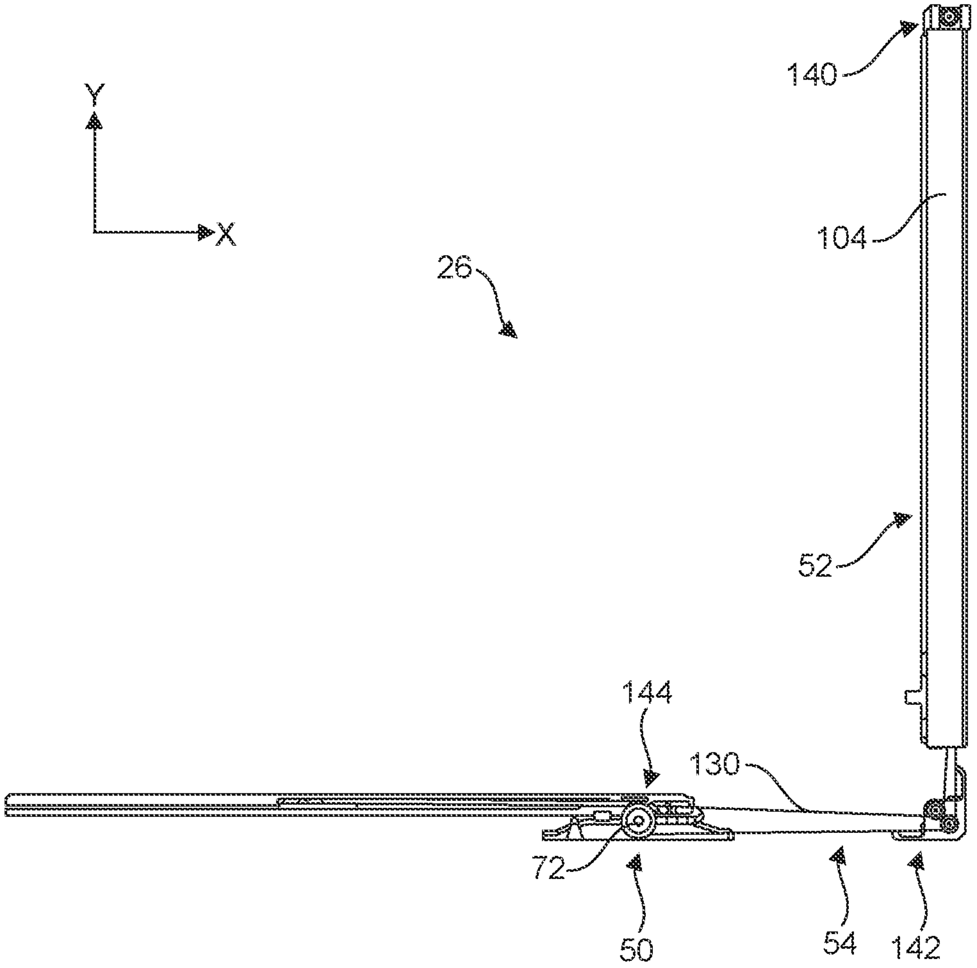
FIG. 2 is an isolated, front view of an operator assembly of the fenestration unit of FIG. 1, according to some embodiments.
Figure 3:
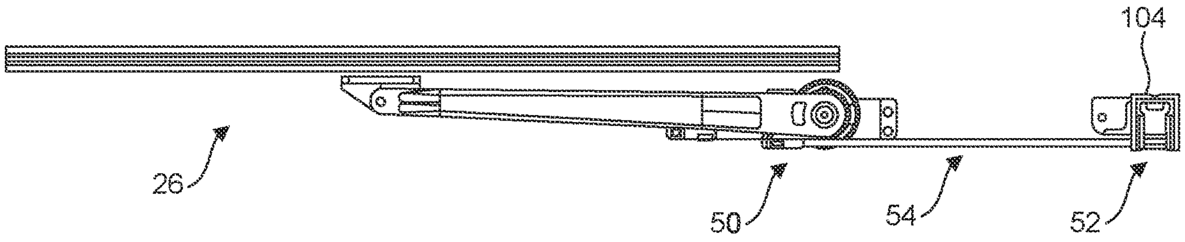
FIG. 3 is an isolated, top view of the operator assembly of FIG. 2, according to some embodiments.

FIG. 2 is an isolated, front view of the operator assembly 26 and FIG. 3 is an isolated, top view of the operator assembly 26. As shown, the operator assembly 26 includes a drive mechanism 50, a slide mechanism 52, and a transfer mechanism 54 operatively coupling the drive mechanism and slide mechanism 52. Generally, the operator assembly 26 is configured to receive a first, linear input from a user of the fenestration unit 10 (FIG. 1) along a first axis (e.g., the Y- or vertical axis), which is then transferred along a second axis (e.g., the X- or horizontal axis) to cause the operator assembly 26 to impart an opening or closing force on the sash 24 (FIG. 1).

Figure 4:
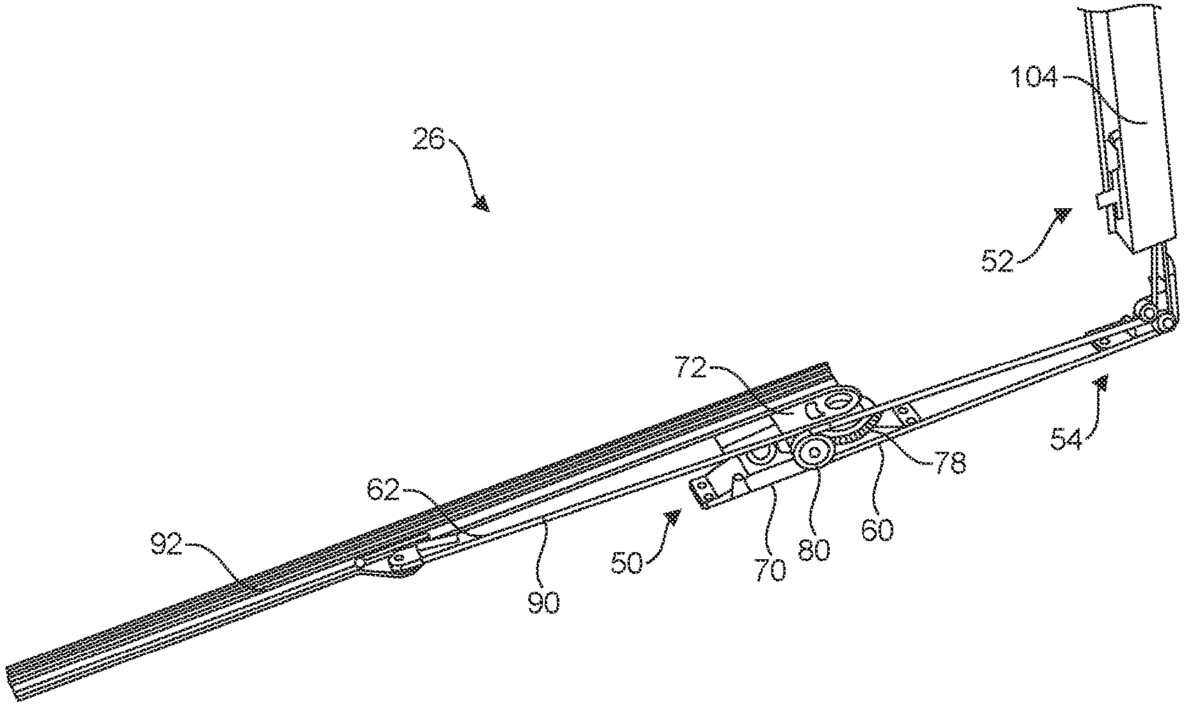
FIG. 4 is an enlarged, isometric view of a portion of the operator assembly of FIG. 2, with a portion of a slide mechanism of the operator assembly truncated in that view, according to some embodiments.
Figure 5:
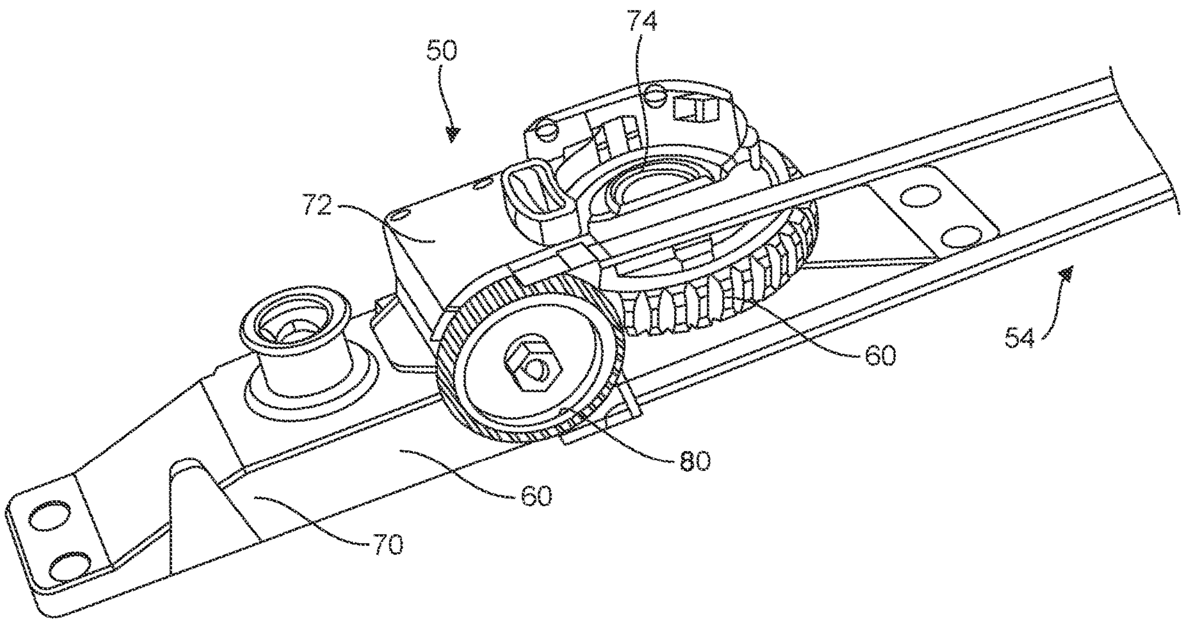
FIG. 5 is an enlarged view of a portion of a drive mechanism of the operator assembly of FIG. 2, according to some embodiments.
Figure 6:
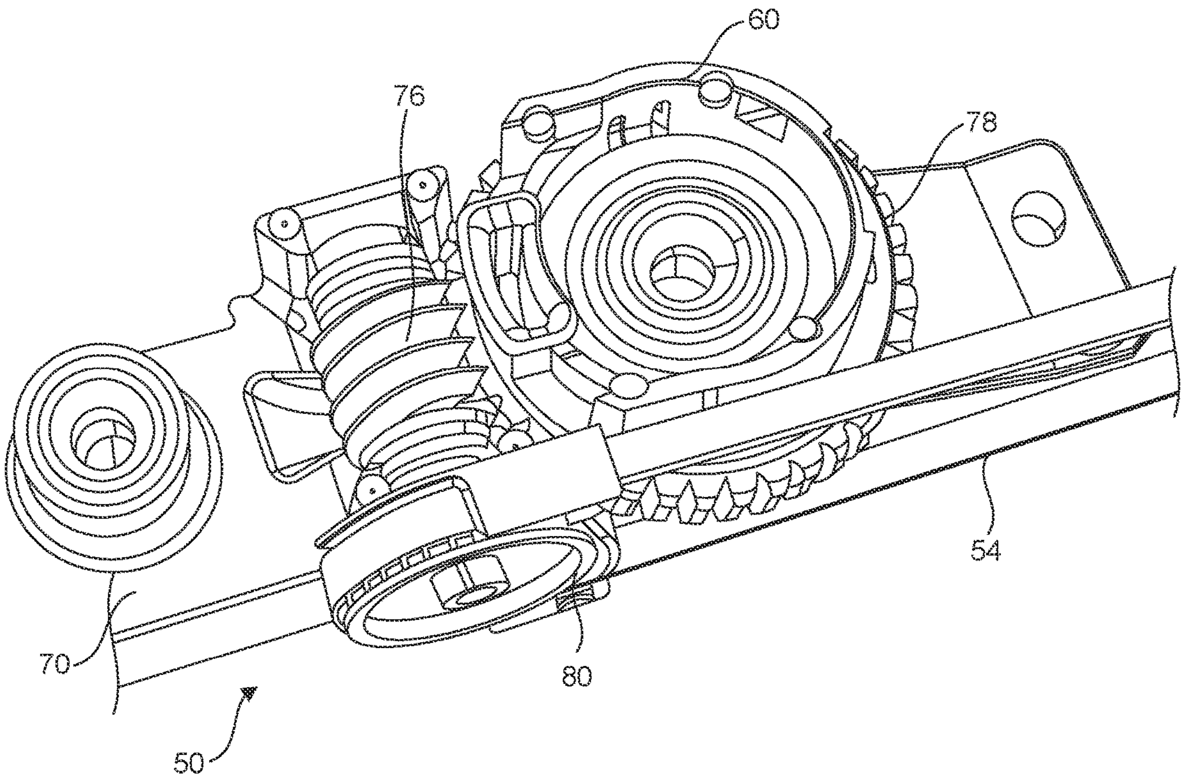
FIG. 6 is an another, enlarged view of the drive mechanism of FIG. 5, with a cover portion removed to allow better visualization of the interaction of gear components of the drive mechanism, according to some embodiments.

FIG. 4 is an enlarged, isometric view of a portion of the operator assembly 26, with a portion of the slide mechanism 52 truncated in that view, and FIG. 5 is an enlarged view of a portion of the drive mechanism 50. FIG. 6 is an another, enlarged view of the drive mechanism with a cover portion removed to allow better visualization of the interaction of gear components of the drive mechanism 50. The drive mechanism 50 is configured to receive an input force (e.g., linear) from the slide mechanism 52 through the transfer mechanism 54 and to translate that input force into an opening force on the sash 24 (FIG. 1) toward the open position and a closing force on the sash toward the closed position.

As shown in FIG. 4, the drive mechanism 50 has a single-arm configuration that includes a gearbox 60 and a linkage assembly 62. Generally, the gearbox 60 is operable to receive input forces (e.g., linear) which are then translated into rotational forces onto the linkage assembly 62 to which the gearbox 60 is operatively coupled. In some examples, a first linear force in a first direction causes the gearbox 60 to rotate in a first rotational direction, and a second linear force in a second, opposite direction causes the gearbox 60 to rotate in a second rotational direction. Though a single-arm configuration is shown, it should be appreciated that dual-arm configurations may also be implemented and may be advantageous in various contexts (e.g., awning-type applications). An example of a suitable dual-arm operator configuration can be found in U.S. application Ser. No. 16/883,481, filed May 26, 2020, by Pella Corporation, and entitled "Slide Operator Assemblies and Components for Fenestration Units."

As shown, the gearbox 60 includes a base 70, a worm housing 72 on the base 70 (removed in FIG. 6), a gear mount 74 (FIG. 5), a worm 76 (FIG. 6), a worm gear 78, and a drive pulley 80. The base 70 is configured to be mounted to the frame 22 (e.g., on the sill 36) of the fenestration unit 10. The worm housing 72 is configured to house or maintain the worm 76 for rotation on the base 70.

The worm 76 is a gear in the form of a screw with helical threading. The worm gear 78 is similar to a spur gear and has teeth for engaging with the threading of the worm 76. In particular, the worm 76 is rotabaly engaged with a worm gear 78, such that upon rotation of the worm 76 (e.g., about an X-axis) the worm 76 engages with and rotates the worm gear 78 (e.g., about a Y-axis).

The drive pulley 80 is attached to at a first end of the worm 76. The drive pulley 80 is configured to interact with the transfer mechanism 54 so that the worm 76 can be driven by the transfer mechanism 54. As shown, the drive pulley 80 may be configured with teeth or other surface features that assist with receiving an input force. The drive pulley 80 is configured to rotate (e.g., about the Z-axis) and is operatively coupled to the worm 76 through a drive shaft or other coupling mechanism with the worm 76 to rotate the worm 76.

As shown in FIG. 4, the linkage assembly 62 includes an arm 90, and a sash brace 92. The arm 90 is coupled to the worm gear 78 (e.g., directly or indirectly) such that the rotation of the worm gear 78 imparts rotational forces on the arm 90. The sash brace 92 is slidably, and pivotally connected to the arm 90, such that the rotational forces on the arm 90 result in an opening or closing swing force in the Y-Z plane on the sash brace 92. The opening or closing swing force is translated to the sash 24 (FIG. 1) by coupling the sash brace 92 to the sash 24 (e.g., at the bottom rail 42).

Figure 7:
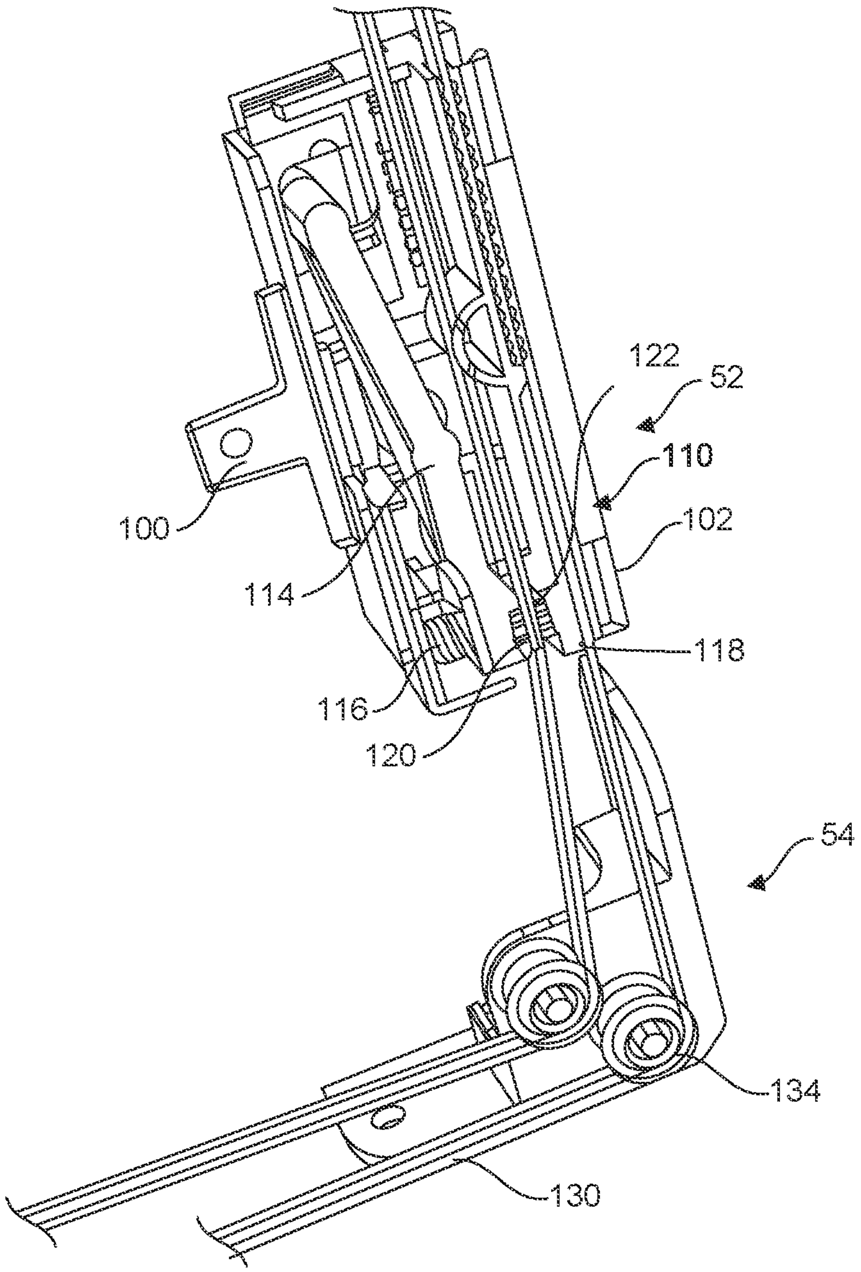
FIG. 7 is an isolated, isometric view of a portion of the slide mechanism and a portion of a transfer mechanism of the operator assembly of FIG. 2, according to some embodiments.

FIG. 7 is an isolated, isometric view of a portion of the slide mechanism 52 and a portion of the transfer mechanism 54. As shown, the slide mechanism 52 includes a handle 100, a carriage or slide member 102 coupled to the handle 100, and a linear rail 104 (FIGS. 2-4) along which the slide member 102 is slidably received. FIG. 7 does not show the linear rail 104 to permit better visualization of the handle 100 and slide member 102.

Figure 10:
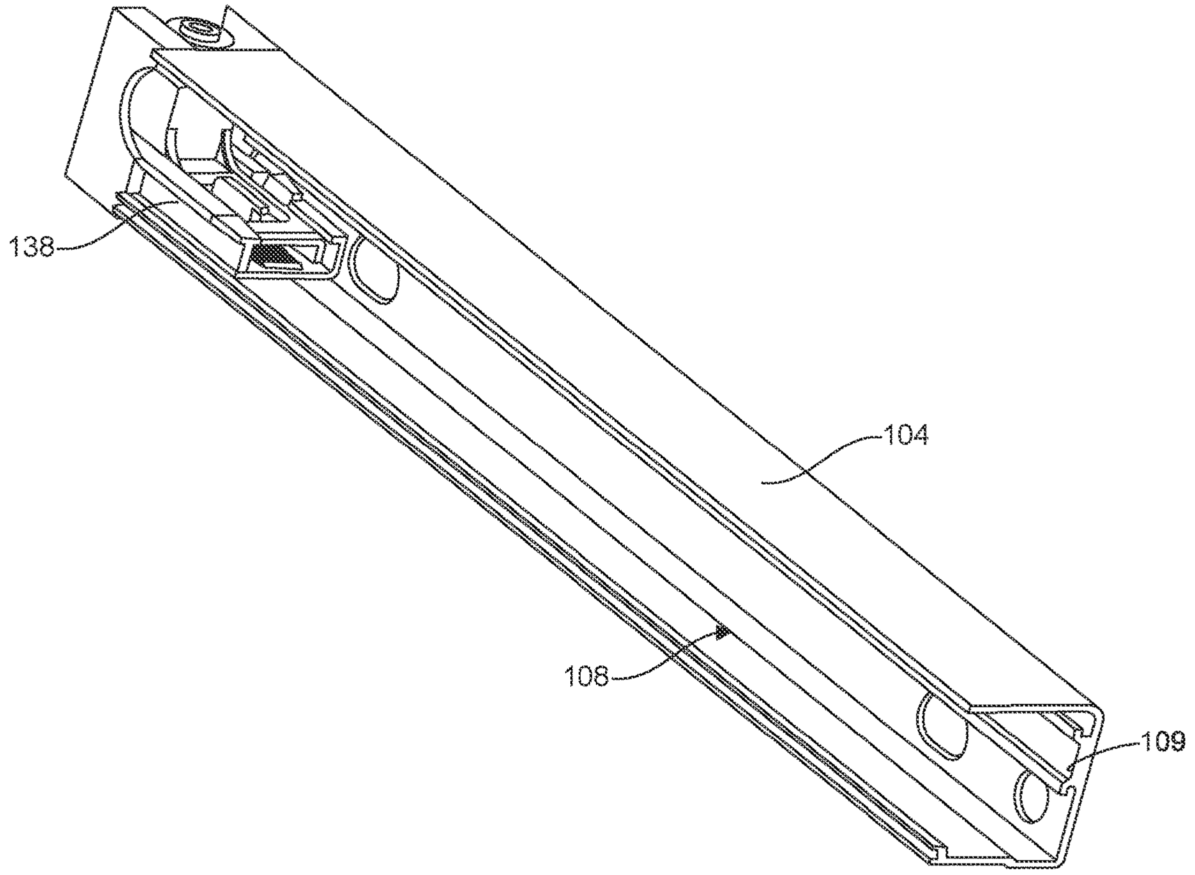
FIG. 10 shows a tensioner assembled to a linear rail, according to some embodiments.

As shown in FIG. 7, the slide member 102 includes an attachment structure 110 (e.g., a channel or slot) for operatively coupling with a portion of the transfer mechanism 54. As best seen in FIG. 10, the linear rail 104 may include a channel 108 having a "C" or "U" shaped cross-section and is configured to slidably receive the slide member 102 of the slide mechanism 52. As best seen in FIG. 10, the channel 108 may include a rail structure 109 for slidably coupling with the slide member 102 (FIG. 7) such that the slide member 102 is retained to, and able to slide along the channel 108.

In various examples the linear rail 104 is associated with (e.g., attached to or integrally formed as part of) the frame 22, such as the first jamb 32 (FIG. 1). In this manner, a user is able to grasp the handle 100 of the slide member 102 and slide the slide member 102 linearly (e.g., vertically) along a portion of the frame 22, such as the first jamb 32 along the linear rail 104. As subsequently described, this linear motion is translated through the transfer mechanism 54 to the drive mechanism 50 (FIG. 4). As shown in FIG. 1, the handle 100 is arranged to project inwardly toward the center of the fenestration unit 10, although the handle can also be modified to project interiorly (i.e., away from the interior side of the fenestration unit 10).

As shown in FIG. 7, the slide member 102 includes an attachment structure 110 (e.g., a channel or slot) for operatively coupling with a portion of the transfer mechanism 54. The attachment structure 110 includes a housing 112, a rocker arm 114, a biasing member 116, and a clamp member 118. The rocker arm 114 is pivotably coupled to the housing 112, and the biasing member 116 is coupled between the rocker arm 114 and the housing 112 to bias the rocker arm 114 toward the clamp member 118. The rocker arm 114 and the clamp member 118 each optionally include engagement features 120, 122, respectively, for enhancing mechanical engagement between the transfer mechanism 54 and the attachment structure 110. In particular, the rocker arm 114 and clamp member 118 pinch a portion of the transfer mechanism 54 between the two. If desired, a user (not shown) may depress the rocker arm 114 (e.g., on the end opposite the engagement feature 120) to release the transfer mechanism to adjust a position of the slide member 102 along the transfer mechanism 54.

Figure 8:
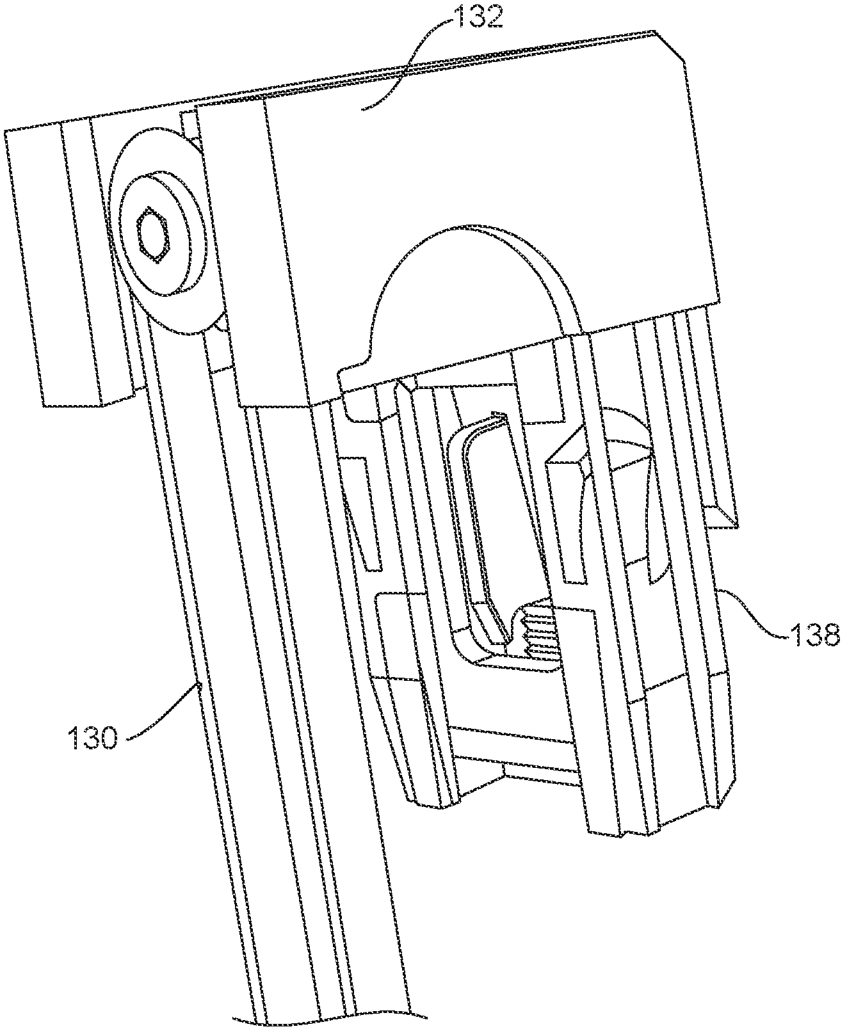
FIGS. 8 and 9 show enlarged views of another portion of the transfer mechanism of the operator assembly of FIG. 2, according to some embodiments.
Figure 9:
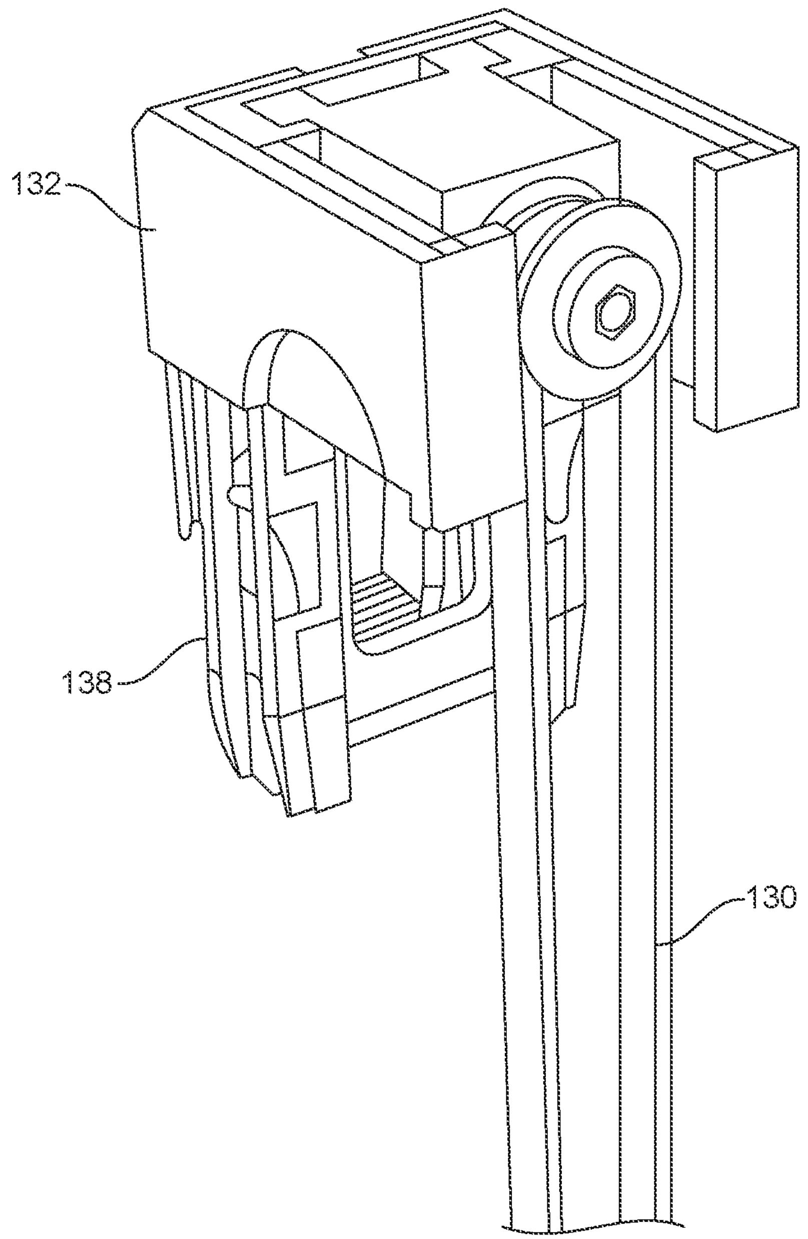

FIG. 1 shows various components of the transfer mechanism 54, FIG. 7 shows an enlarged view of a portion of the transfer mechanism 54, and FIGS. 8 and 9 shown an enlarged view of another portion of the transfer mechanism 54, and FIG. 10 shows an enlarged view of the transfer mechanism 54 from still another perspective.

With reference to FIGS. 7 to 9 and back to FIG. 1, the transfer mechanism 54 is shown including a drive belt 130, a first transfer block 132, a second transfer block 134, and a tensioner 138 (FIGS. 8 and 9). The drive belt 130 is generally a ribbed or toothed belt that is flexible and resilient. For reference, the ribs or teeth of the drive belt 130 are generally not shown in the figures for ease of illustration, although FIG. 23 does include lines generally representing the ribbed, or toothed nature of the drive belt 130. Generally, the ribs or teeth run transversely across at least one face (e.g., the face that is toward complementary teeth or ribbing of various pulley, handle, and tensioner features) of the drive belt 130 to engage with the various features of the system (e.g., pulley, handle and tensioner) subsequently described. In a general sense, such the design of the drive belt 130 may be similar to serpentine drive belt designs in automobile applications. As another example, the drive belt 130 may be similar to the drive belts shown and described in U.S. App. Pub. 2020/0370355, filed May 26, 2020 by Bernhagen et al. or U.S. App. Pub. 2009/0283227, filed Apr. 2, 2009 by Mohat et al. Other drive belt designs (e.g., wires, flat ribbons, and others) are also contemplated. The first transfer block 132 includes a pulley system that the drive belt 130 is able to travel around and reverse direction. As shown in FIG. 1, the first transfer block 132 is located along the first jamb 32 toward the head 30 (FIG. 1). The second transfer block 134 also includes a pulley system (e.g., a dual pulley system) and is configured to redirect the drive belt 130 direction of travel from a first axis, or direction of travel to a second axis or direction of travel that is offset by about 90 degrees from the first axis or direction of travel. As shown, the second transfer block 134 is configured to redirect the drive belt 130 from a generally horizontal path, axis, or direction to a generally vertical path, axis, or direction. The second transfer block 134 may be located toward a corner of the fenestration unit 10 (e.g., toward an intersection of the first jamb 32 and the sill 36 shown in FIG. 1).

As shown in FIG. 2, the drive belt 130 has a first portion 140 looped around the first transfer block 132, an intermediate portion 142 looped past the second transfer block, and a second portion 144 looped around the drive pulley 80. The drive belt 130 (e.g., two ends of the drive belt 130), is secured to the slide member 102. In this manner, the drive belt extends along the first jamb 32 and then along the sill 36 in a continuous loop. As shown, the drive belt 130 is coupled to the slide member 102 using the attachment mechanism (e.g., ribbed teeth). In operation, the handle 100 is slid along a first axis (e.g., upwardly or downwardly along the Y-axis), resulting in the drive belt 130 being driven along the Y-axis and then along the X-axis through a generally perpendicular path, which then results in turning of the drive pulley 80. As previously referenced, actuation of the drive pulley 80 (e.g., by imparting an actuation force through the drive belt 130) causes the drive mechanism 50 to open and close the sash. In other words, the slide mechanism 52 is operatively coupled to the drive mechanism 50 via the transfer mechanism 54, the slide mechanism being slidable to cause the drive mechanism to impart the opening force and the closing force, respectively, on the sash 24.

Figure 11:
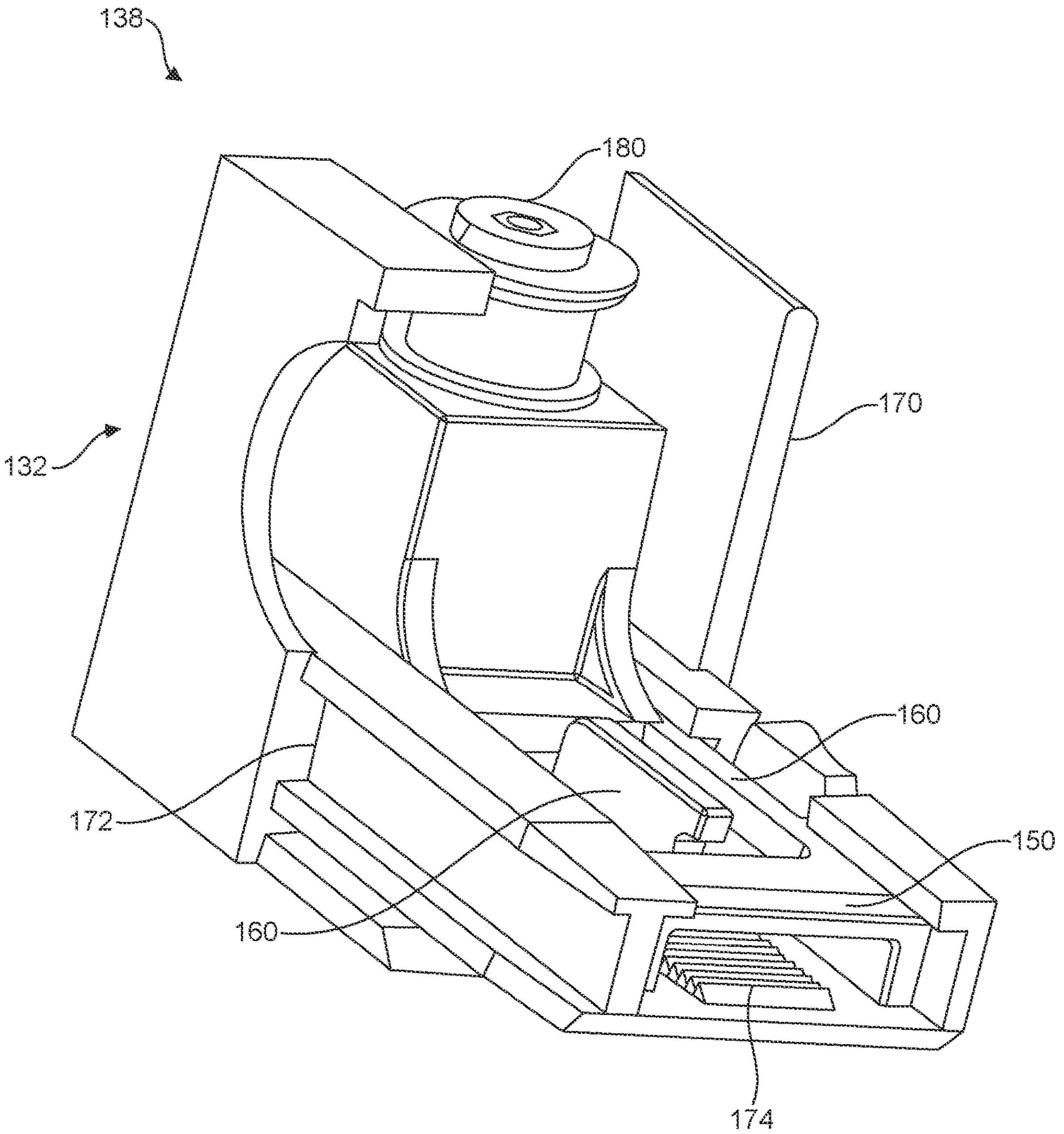
FIG. 11 shows the tensioner isolated from a remainder of the fenestration unit, according to some embodiments.

FIG. 10 shows the tensioner 138 assembled to the linear rail 104 and FIG. 11 shows the tensioner 138 isolated from the remainder of the fenestration unit 10. As shown, the tensioner 138 is integrally formed as a part of the first transfer block 132. In some embodiments, the tensioner 138 includes a sled 150 having a base 152 and a pawl 160 coupled to the base 152. The tensioner 138 also includes a guide 170 having a track 172 and a ratchet 174. The track 172 of the guide 170 slidably receives the base 152 of the sled 150 such that the base 152 is restricted to sliding in a first direction with respect to the guide along a sliding axis (e.g., vertically as shown, or horizontally in other embodiments) and a second direction along the sliding axis that is opposite the first direction. The tensioner 138, and more generally the first transfer block 132, also includes a pulley 180 coupled to the guide 170. The pulley 180 is free to rotate about a rotational axis that is transverse to the sliding axis and is configured to receive the drive belt 130 in a manner that permits driving the drive belt 130 (FIG. 2) around the pulley 180.

The pawl 160 of the sled 150 is in biased engagement with the ratchet 174 of the guide 170 to permit sliding in the first direction (e.g., away from the second transfer block 134 and/or the drive pulley 80) to tension the drive belt 130 and restrict sliding in the second direction which would otherwise loosen the drive belt 130. As described in further detail below, the pawl 160 is also configured to be manually disengaged from the ratchet 174 to permit sliding in the second direction (e.g., to loosen the drive belt 130 and/or disassemble one or more portions of the operator assembly 26). Although the pawl 160 is associated with the sled 150 in the depicted example, the pawl 160 may alternatively be integrated into the guide 170 with the ratchet, in turn, being integrated into the sled 150. Thus, in various examples, a pawl (e.g., substantially similar to that of the pawl 160) of the guide 170 is in biased engagement with a ratchet (e.g., substantially similar to the ratchet 174) of the sled 150 to permit sliding in the first direction (e.g., away from the second transfer block 134 and/or the drive pulley 80) to tension the drive belt 130 and restrict sliding in the second direction which would otherwise loosen the drive belt 130.

Figure 12:
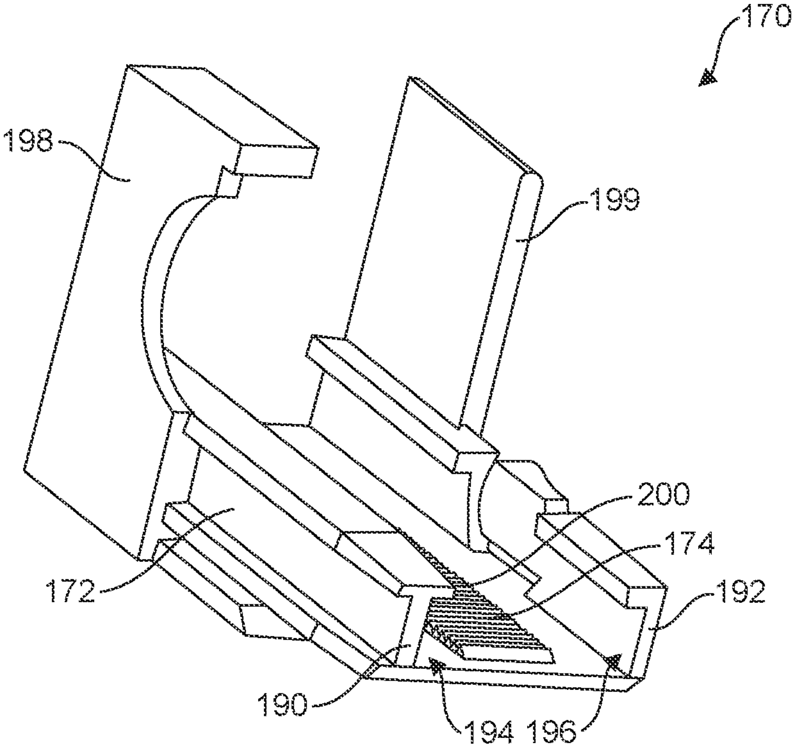
FIGS. 12 to 15 show the guide isolated from a remainder of the tensioner, where
Figure 13:
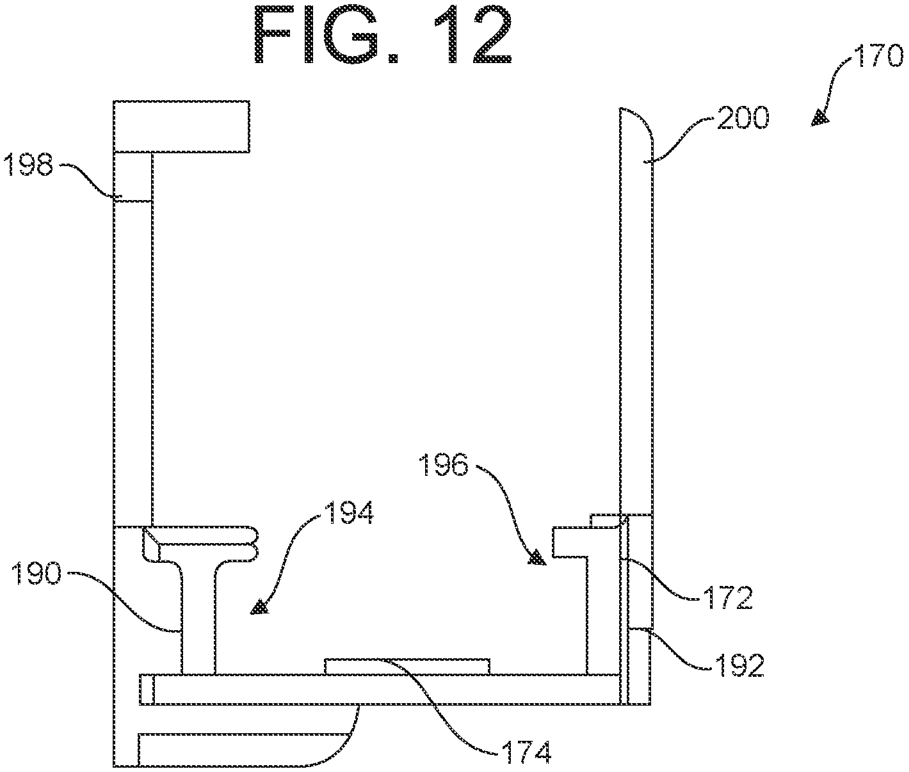
Figure 14:
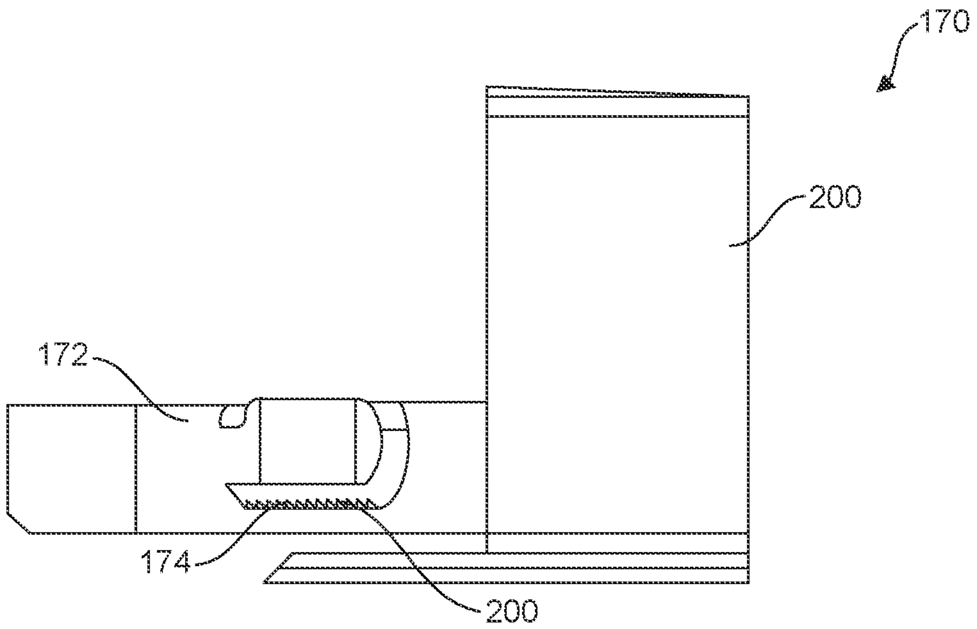
Figure 15:
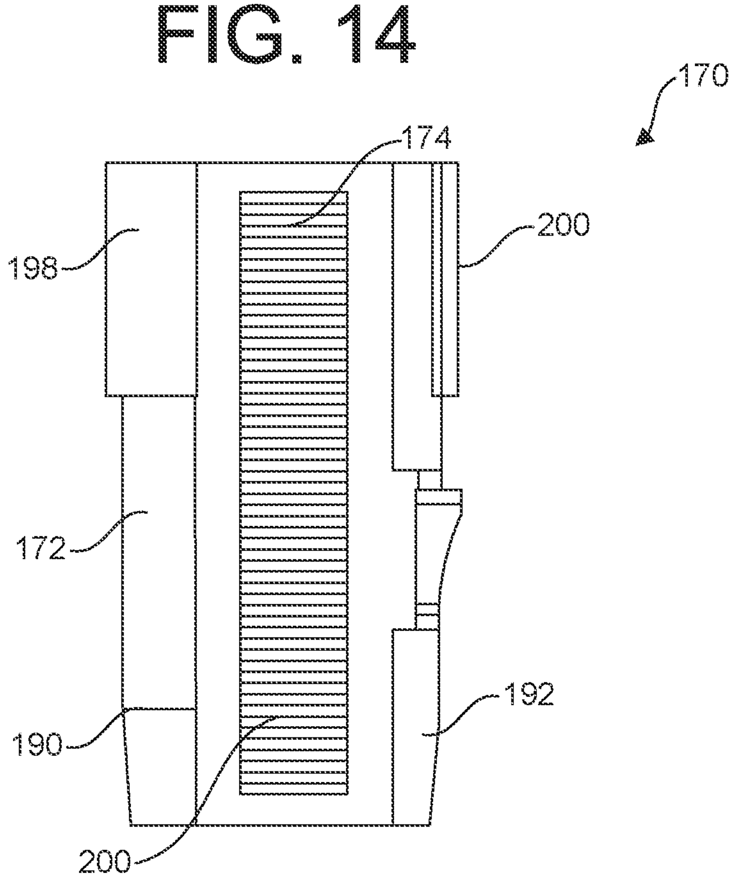

FIGS. 12 to 15 show the guide 170 isolated from a remainder of the tensioner 138, where FIG. 12 is an isometric view, FIG. 13 is an end-view, FIG. 14 is an elevation view, and FIG. 15 is a plan view. As shown, the guide 170 can be L-shaped overall from a side view and U- or C-shaped overall from an end-view with a central channel or slot running the longitudinal length of the guide 170. The track 172 has opposing side walls 190, 192 that form opposing retention channels 194, 196 configured to slidably retain the sled 150 (FIG. 11). The track also has opposing ears 198, 199 that are wider than adjacent portions of the guide 170. The ears 198, 199 are configured to abut against the end of the linear rail 104 when the tensioner 138 is inserted into the linear rail 104 (FIG. 10) upon assembly thereto. In various embodiments, the channel 108 of the linear rail 104 (FIG. 10) acts as a housing receiving the sled 150 and guide 170, the guide 170 being fixedly coupled to the housing formed by the linear rail 104.

The ratchet 174 of the guide 170 is a raised portion that includes a plurality of teeth 200 that are angled to facilitate sliding of a complementary set of teeth in a first direction of engagement but to engage, or bite into the complementary teeth in a second direction in a second direction of engagement that is opposite to the first direction of engagement.

Figure 16:
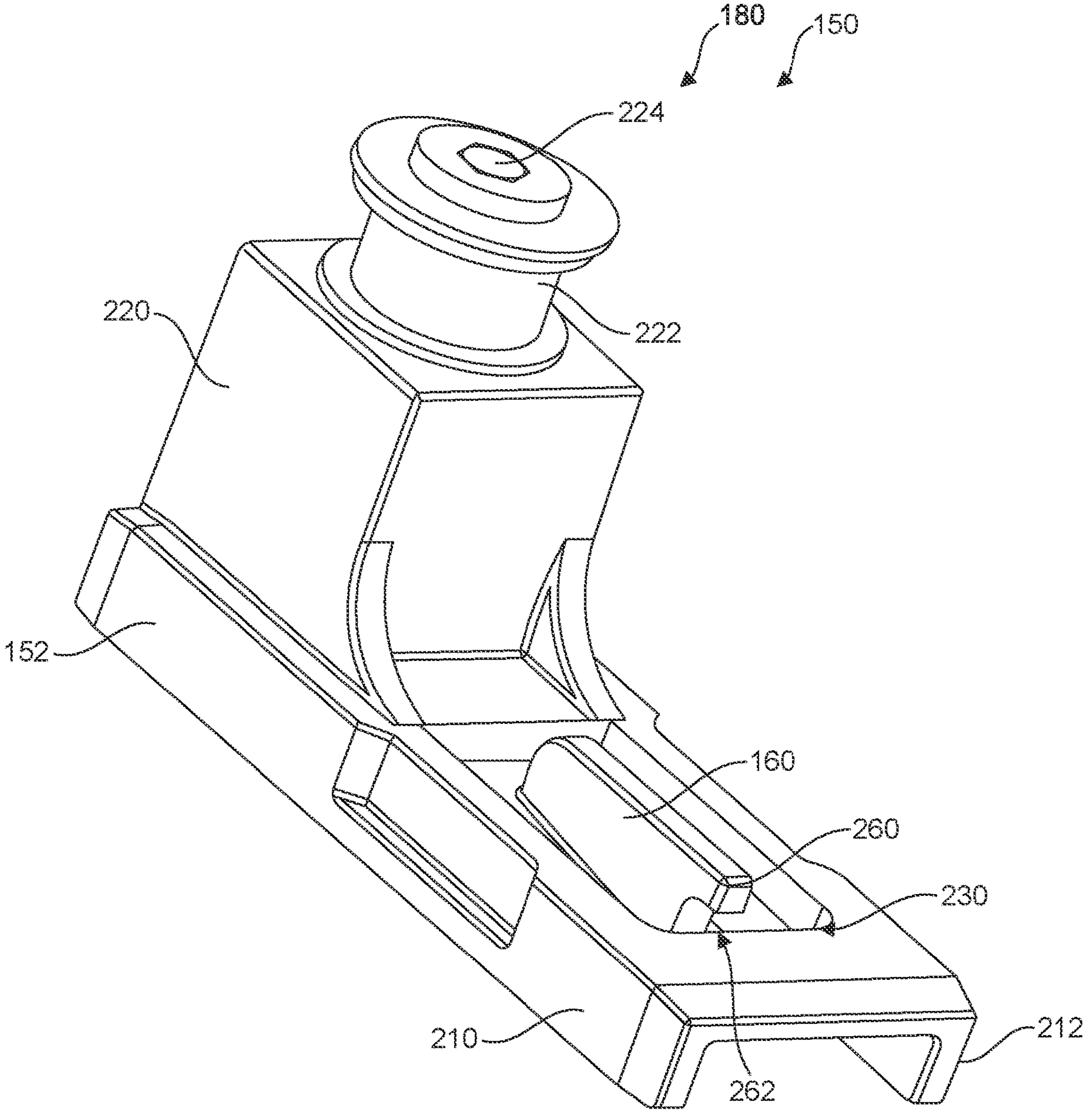
FIGS. 16 and 17 are isometric views of a sled isolated from a remainder of the tensioner.
Figure 17:
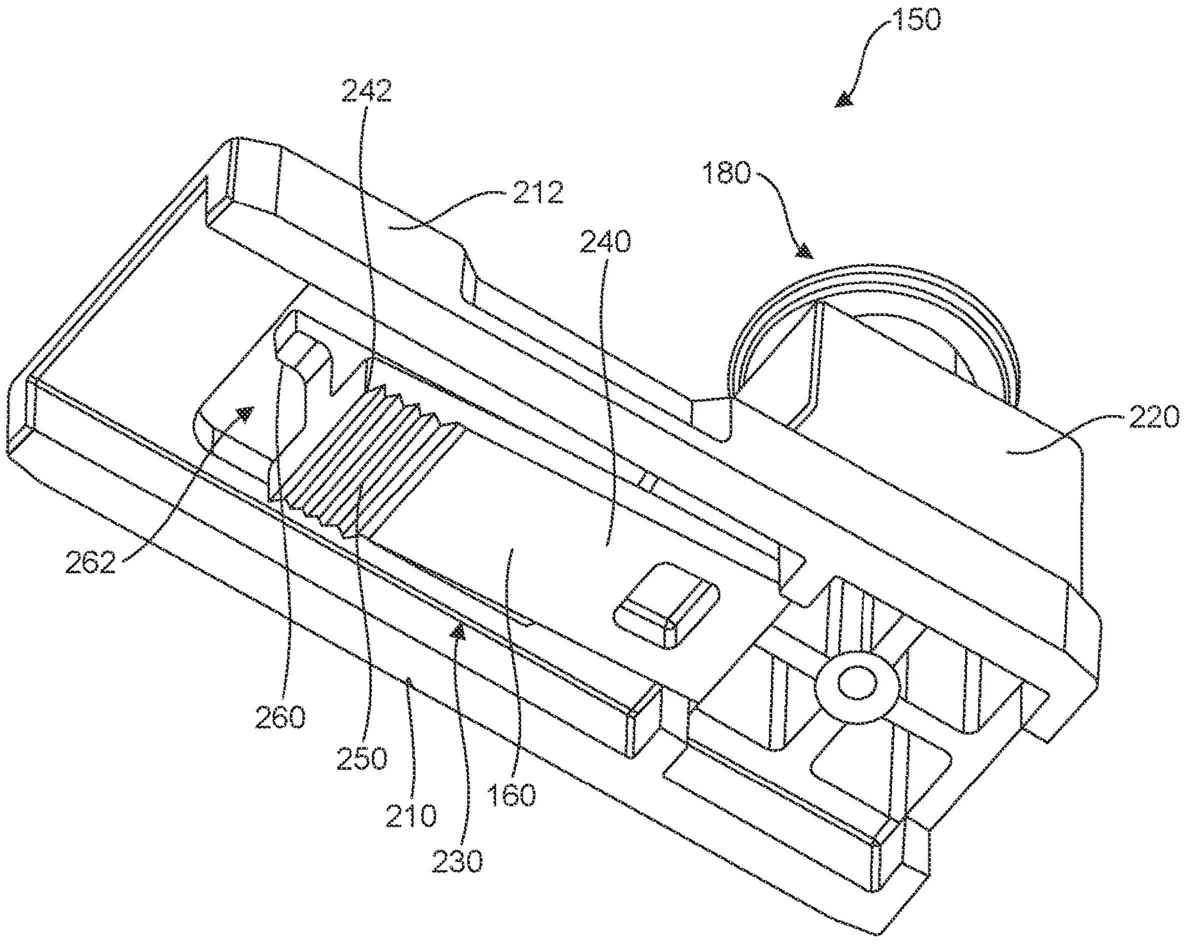
Figure 18:
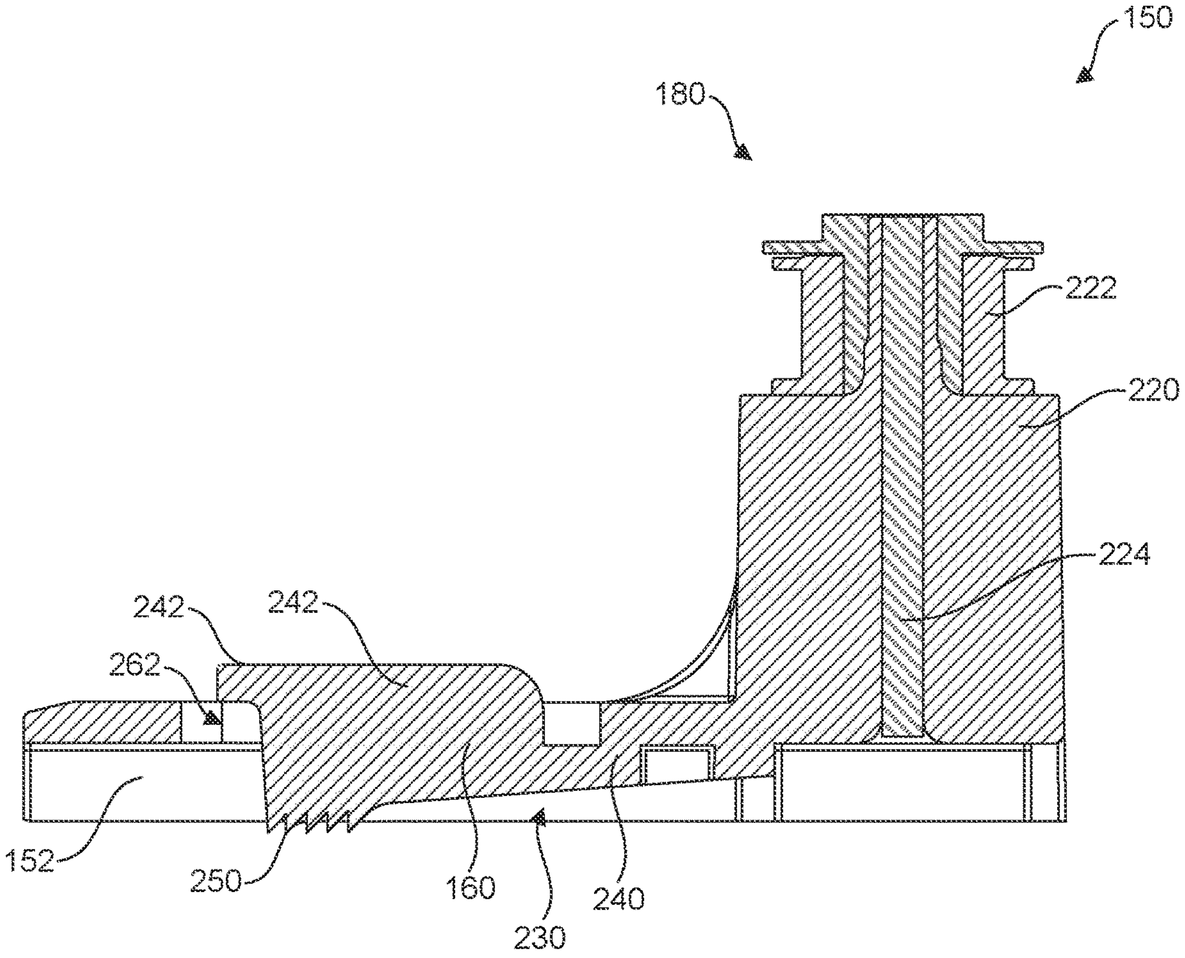
FIG. 18 is an elevation view of a longitudinal cross-section of the sled taken along a central, longitudinal axis of the sled, according to some embodiments.

FIGS. 16 and 17 are isometric views of the sled 150 isolated from a remainder of the tensioner 138, and FIG. 18 is an elevation view of a longitudinal cross-section of the sled 150 taken along a central, longitudinal axis of the sled 150. As shown, the sled 150 can be L-shaped overall from a side view and is sized to fit within the U- or C-shaped profile of the guide 170 (FIG. 12), and in particular the central channel or slot running the longitudinal length of the guide 170. As shown, the base 152 of the sled 150 forms opposing retention shoulders 210, 212 configured to be slidably received in the opposing retention channels 194, 196 of the guide 170 (FIG. 12) to retain the sled 152 to the guide 170. The base 152 also includes a mount 220 for the pulley 180, which in turn includes a wheel 222 and a shaft 224 coupled to the wheel 222 and the mount 220 such that the wheel 222 is able to rotate.

As shown, the pawl 160 of the sled is coupled to the base 152, where the pawl 160 extends longitudinally within a pocket 230 formed in the base 152. In particular, the pawl 160 includes a neck portion 240 extending from the base 152 (e.g., being integrally formed therewith) and a head portion 242 that is a free end (e.g., in the manner of a cantilever).

The neck portion 240 is configured to be resiliently deflected. The head portion 242 includes a plurality of teeth 250 that are angled to facilitate sliding with the plurality of teeth 200 of the ratchet 174 of the guide 170 (FIG. 10). When the plurality of teeth 250 are moving in the unrestricted direction (e.g., a tensioning direction), the pawl 160, and particular the head portion 242, slides up and over the angled edges of the plurality of teeth 200, with a spring force (e.g., either via the resiliently deflectable nature of the neck portion 240) pushing one or more of the teeth 250 into the depression(s) between one or more of the teeth 200 as they slide past one another. When the teeth 250 move in the opposite (a de-tensioning) direction, however, the teeth 250 of the pawl 160 will catch against the sloped, or angled edges of the teeth 200, thereby locking the sled 150 and preventing any further motion in that (e.g., de-tensioning) direction.

Thus, the first plurality of teeth 200 of the guide 170 (and more specifically, the ratchet 174) and the second plurality of teeth 250 of the sled 150 (and more specifically, the pawl 160) are configured to mate with one another to permit ratcheted sliding in the first (e.g., tensioning) direction. This is facilitated as the head portion 242 is configured to engaged with the ratchet 174 and the neck portion 240 is configured to elastically deflect to permit sliding of the sled 150 in the first (e.g., tensioning) direction with respect to the guide 170.

In various examples, the pawl 160, and in particular the neck portion 240 is also configured to be flexed to manually disengage the head portion 242 from the ratchet 174 to permit sliding of the sled 150 in the second (de-tensioning) direction with respect to the guide 170. For example, as shown, the head portion 242 optionally includes a lip 260 that defines a receiving slot 262 for accessing the lip 260 (e.g., with a screw driver, or a digit of a user) to flex the neck portion 240 to manually disengage the head portion 242 from the ratchet 174.

Figure 19:
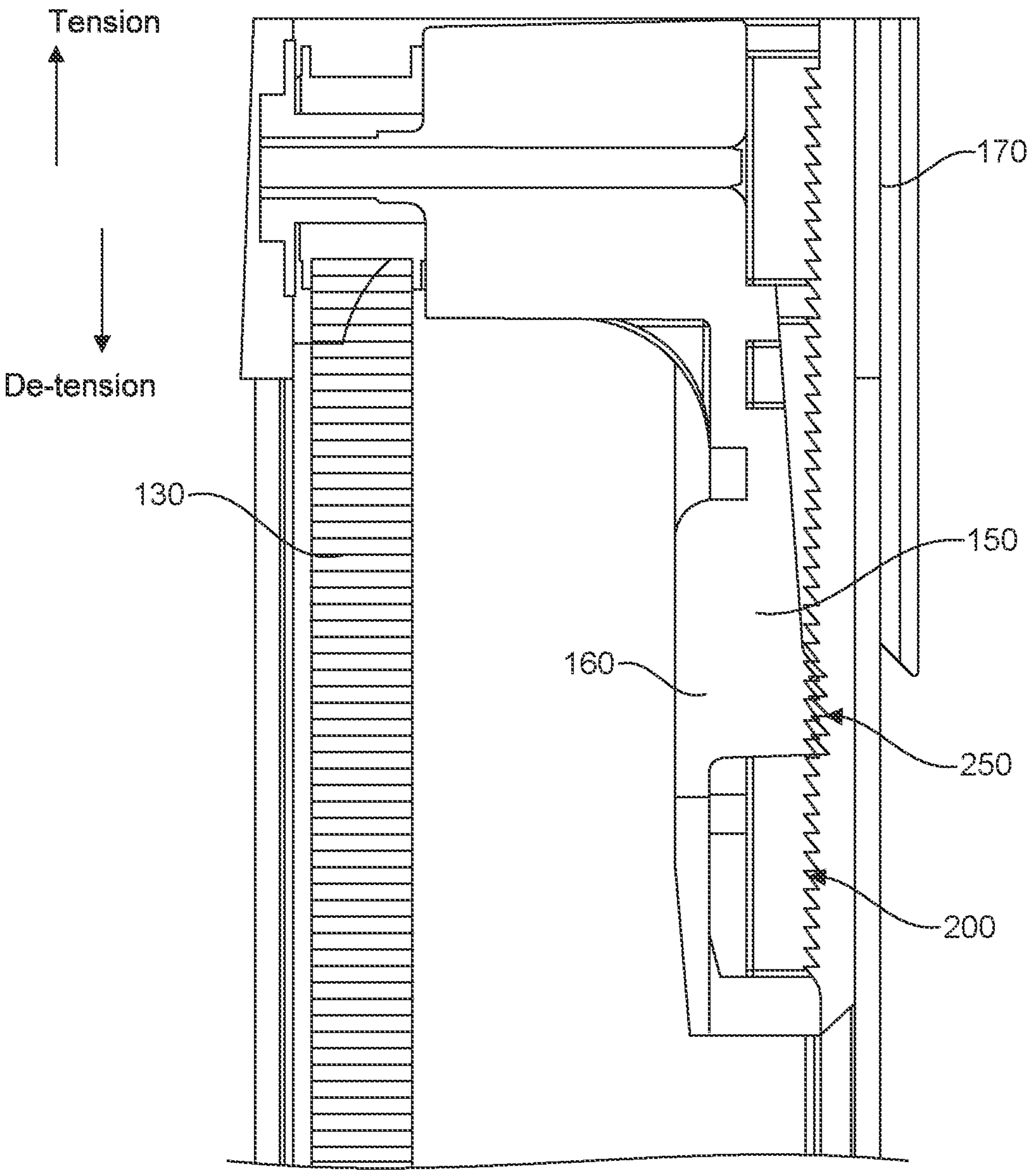
FIG. 19 is a longitudinal section of the tensioner assembled to the linear rail, according to some embodiments.

FIG. 19 is a longitudinal section of the tensioner 138 assembled to the linear rail 104. The complementary fit of the first and second pluralities of teeth 200, 250 is able to be seen more clearly in FIG. 19. With reference between FIGS. 1, 2, 8, 9 and 19 a method of tensioning the operator assembly 26, and in particular a drive belt 130 of the operator assembly 26 (FIG. 2), according to some embodiments, can be described. For example, tensioning the operator assembly 26 can include indexing, or sliding the sled 150 relative to the guide 170 in a first direction (tensioning direction) to remove a desired amount of slack or play from the drive belt 130 and the rest of the operator assembly 26. If too much tension is achieved, a user may release the sled 150 by actuating the pawl 160 and iterate as necessary to achieve the desired tension in the drive belt 130. For reference, too much tension in the drive belt 130 may result in too much force required to actuate the slide mechanism 52 to use the operator assembly 26. Too little tension, in turn, may permit belt slippage or for the drive belt 130 to come off the first transfer block 132, the second transfer block 134, or the drive pulley 80, for example.

In use, an operator of the operator assembly 26 operates, or actuates the slide mechanism 52 by grasping the handle 100 and sliding the slide member 102 along the linear rail 104. This, in turn, causes the drive belt 130 to move in a circuit around the first transfer block 132, the second transfer block 134, and the drive pulley 80. By sliding the handle 100 and the slide member 102 in a first direction, the drive pulley 80 is rotated in a first direction. And, by sliding the handle 100 and the slide member 102 in the opposite direction, the drive pulley 80 is rotated in a second, opposite direction. This, in turn, is translated through the worm 76, and then the worm gear 78, which actuates the linkage assembly 62, and in particular the arm 90 and the sash brace 92 attached to the sash 24 to open and close the sash 24.

Figure 20:
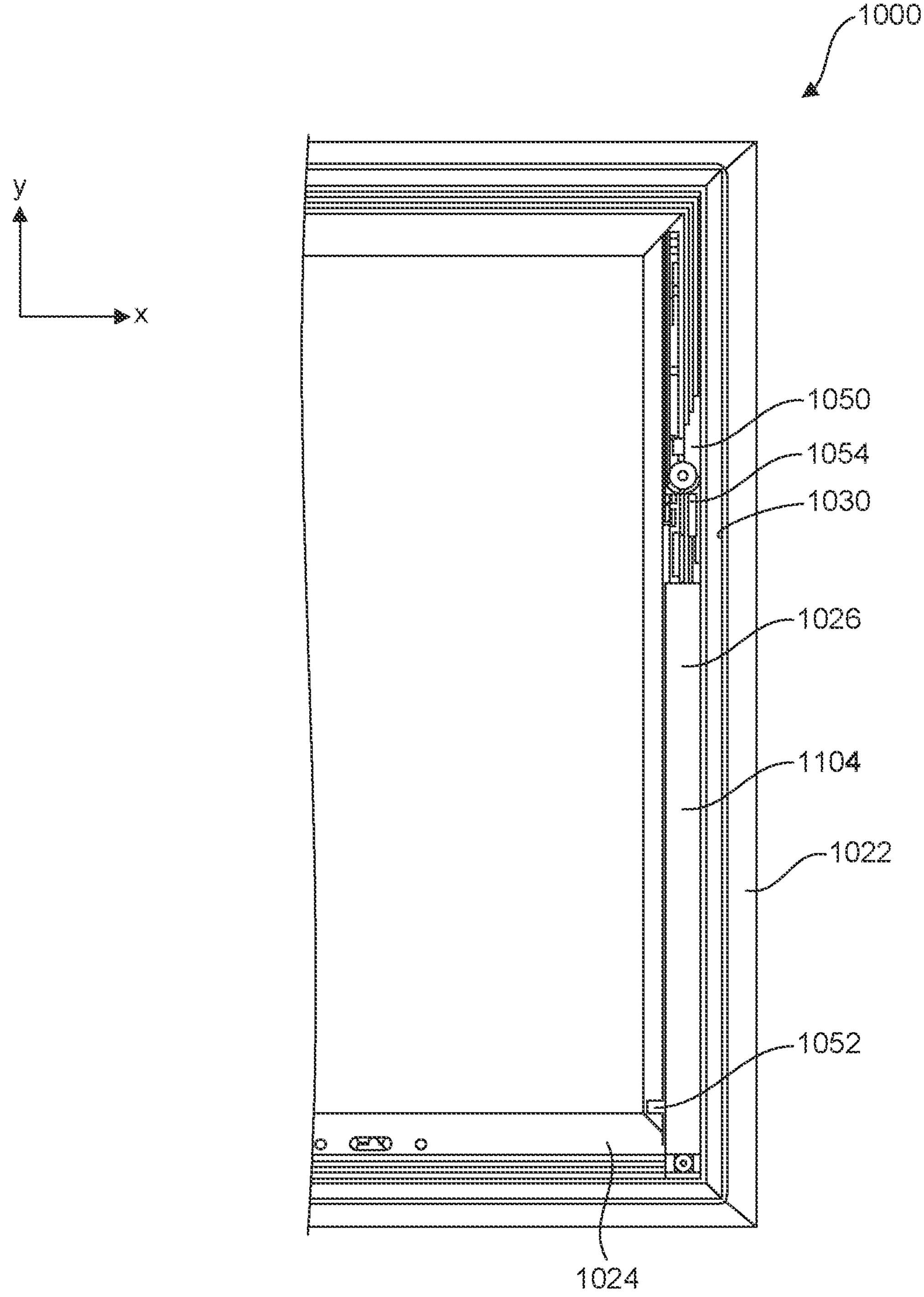
FIG. 20 shows a partial view of a fenestration unit configured in an awning style.
Figure 21:
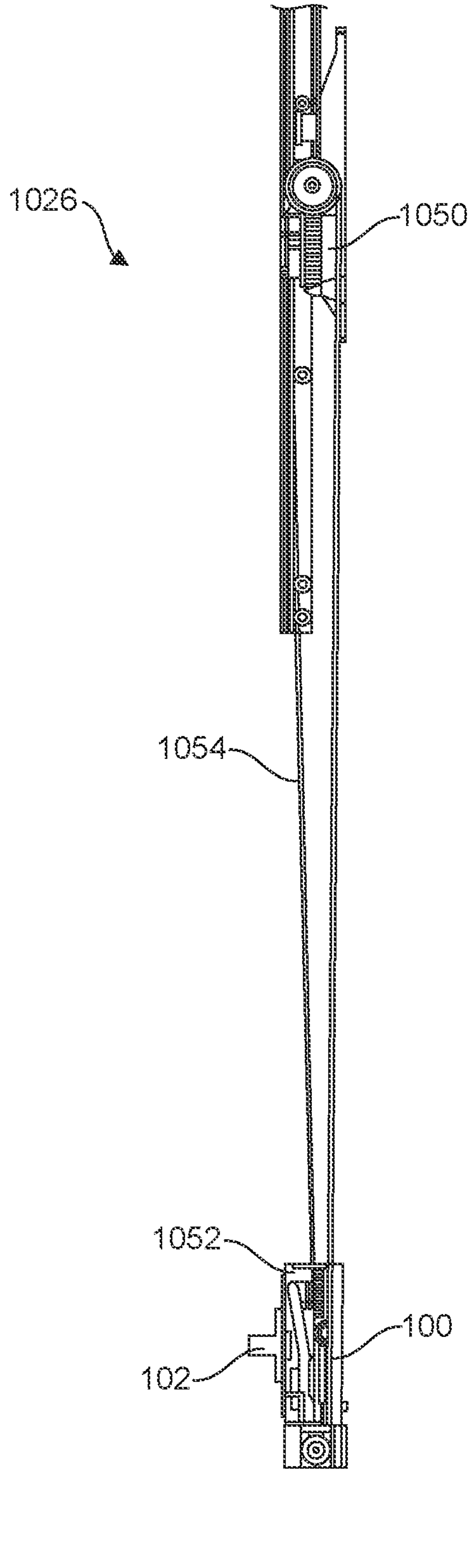
FIG. 21 shows an associated operator assembly isolated from the remainder of the fenestration unit, according to some embodiments.

Although embodiments with a second transfer block 134 have been described, in other embodiments fewer or greater numbers of transfer blocks are included. For example, FIG. 20 shows a partial, elevation view of a fenestration unit 1000 from an interior facing-side, the fenestration unit 1000 being configured in an awning style (in FIG. 20, one side of the unit is shown). And, FIG. 21 shows an associated operator assembly 1026 isolated from the remainder of the fenestration unit 1000. The various components of the fenestration unit 1000 are largely similar to those of the fenestration unit 10, other than differences shown and/or described, and are referenced with the same numbers as those of the fenestration unit 10 except graduated by "1000" in order to avoid confusion. As shown, the fenestration until has a frame 1022 largely similar to frame 22, a sash 1024 hinged to the frame 1022 such that the sash 1024 is pivotable or otherwise movable (e.g., through a pivoting and swinging motion) between an open position and a closed position, and the operator assembly 1026 operable to transition the sash 1024 between the open and closed positions that has many of the same components and features as those described in association with the operator assembly 26.

Apart from more typical differences when changing from a casement-to an awning-style unit (e.g., hinge changes needed to swing, or pivot open vertically, rather than horizontally) one difference in configuration shown in FIG. 20 from that of FIG. 1 is that the operator assembly 1026, and in particular a drive mechanism 1050, a slide mechanism 1052, and a transfer mechanism 1054 of the operator assembly 1026, is coupled to a first jamb 1030 operatively coupling the drive mechanism and slide mechanism 52. And, here, the operator assembly 1026 is generally configured to receive a first, linear input from a user of the fenestration unit 1000 along a first axis (e.g., the Y- or vertical axis), which is then transferred along the first axis (e.g., the Y- or vertical axis) to cause the operator assembly 1026 to impart an opening or closing force on the sash 1024.

As shown, a component corresponding to the second transfer block 134 is omitted from the operator assembly 1026, as a change in direction of the input force is not required. If desired, however, a second transfer block similar to the one described with the fenestration unit 10 may be implemented to facilitate the change in direction of force similar to that associated with the fenestration unit 10.

Figure 22:
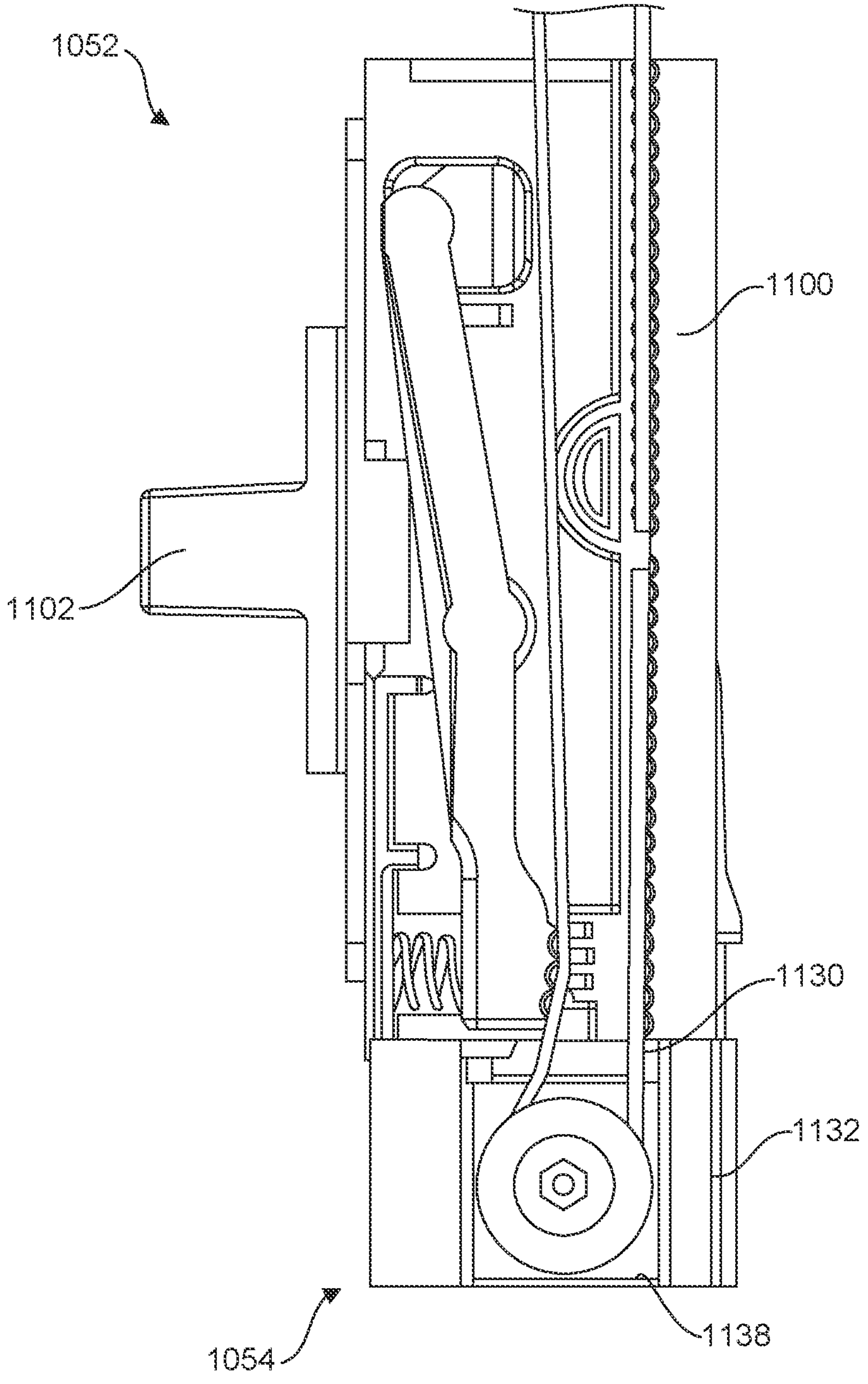
FIGS. 22 and 23 show a close-up view of portions of a slide mechanism and a transfer mechanism of the fenestration unit of FIG. 20, according to some embodiments.
Figure 23:
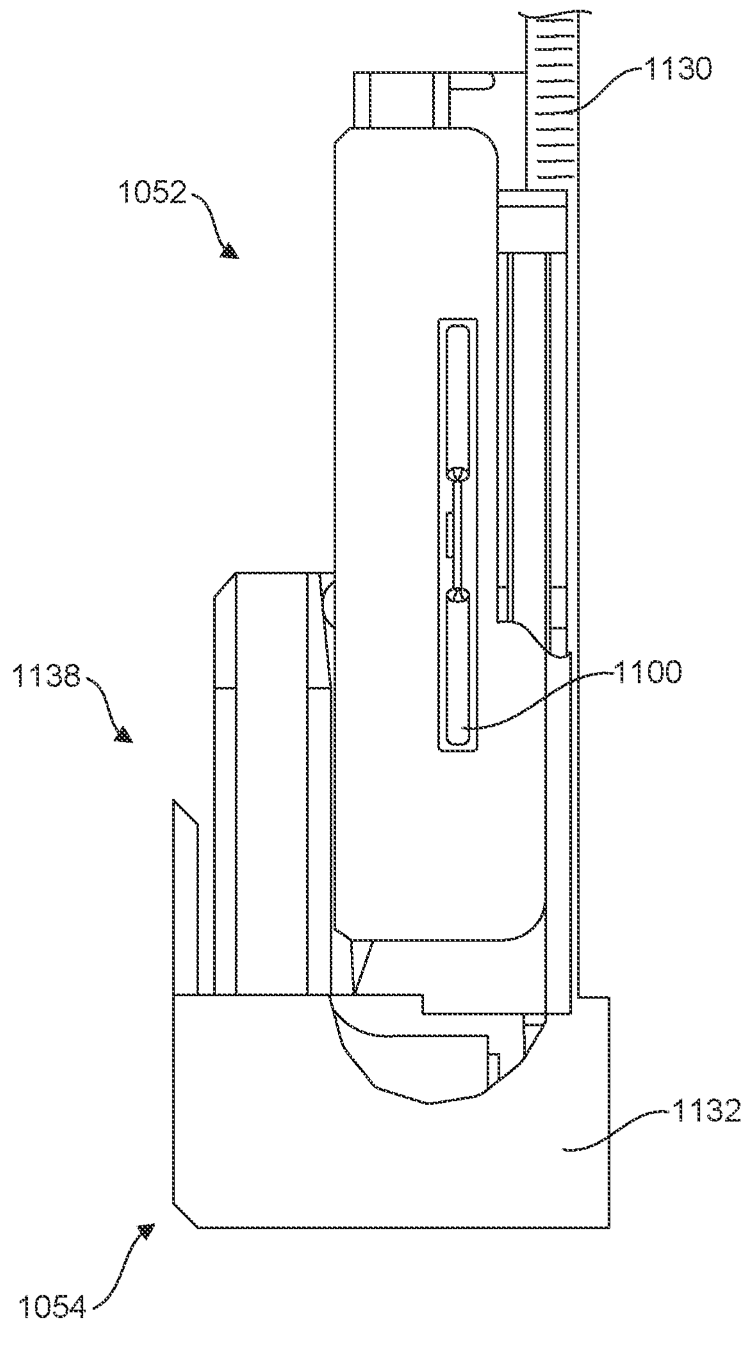

FIGS. 22 and 23 show a close-up view of portions of the slide mechanism 1052 and transfer mechanism 1054 at a handle 1100 and carriage or slide member 1102 coupled to the handle 1100 and a first transfer block 1132 which is integrally formed with a tensioner 1138. FIGS. 21 to 23 do not show a linear rail 1104 of the operator assembly 1026 to permit better visualization of the handle 1100 and slide member 1102. The travel of motion of the slide member 1102 is somewhat different from that of the slide member 102 (FIG. 7). As shown in FIGS. 20 to 23, the slide member 1102 is positioned closer to the first transfer block 1132 than the slide member 102 is positioned to the first transfer block 132. For example, the slide member 1102 may be abutted against, or otherwise adjacent to the first transfer block 1132. The tensioner 1138 is configured similarly to, and operates similarly to the tensioner 138, to tension a drive belt 1130 of the operator assembly 1026. The tensioner 1138 can be indexed away from a drive pulley 1080 of the drive mechanism 1050, and in particular a sled 1150 of the tensioner 1138 can be adjusted away from the drive pulley 1080 to tension the drive belt 1130. And, similarly to the tensioner 1138, the sled 1150 can be released (e.g., manually using a user's digit or a tool) to de-tension or adjust the tension in the drive belt 1130.

Various of the remaining components of the fenestration unit 1000 are left from further discussion, but it should be readily appreciated that they may generally be similar in structure to, and operate similarly in function to, those of the fenestration unit 10. And, where differences have been called out in the text or drawings, it should be appreciated that those differences may be applied between the various embodiments. In particular, various feature and components of the embodiments described above may be interchanged, or applied cumulatively to one another, or in a broad sense to other fenestration units where such components and operability would be desirable. In other words, the inventive concepts provided by this disclosure have been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A fenestration unit comprising:

a frame;

a panel coupled to the frame such that the panel is movable between an open position and a closed position;

a drive mechanism coupled to the frame and operable to actuate the panel between the open and closed positions;

a transfer mechanism including a drive belt having a length including a first portion and a second portion along the length of the drive belt; and a slide mechanism including a handle, a slide member coupled to the handle, and a linear rail along which the slide member is slidably received such that the slide member is operable to slide in a linear motion, the slide member including an attachment structure for operatively coupling with the drive belt to transfer the linear motion through the transfer mechanism to the drive mechanism, the attachment structure being attached to the first portion of the drive belt and releasably attached to the second portion of the drive belt such that a position of the attachment mechanism along the length of the drive belt may be adjusted by a user.

2. The fenestration unit of claim 1, wherein the attachment structure includes a housing, a rocker arm, a biasing member, and a clamp member, the rocker arm being pivotably coupled to the housing, and the biasing member being coupled between the rocker arm and the housing to bias the rocker arm toward the clamp member.

3. The fenestration unit of claim 2, wherein at least one of the rocker arm and the clamp member include engagement features configured to enhance mechanical engagement between the transfer mechanism and the attachment structure.

4. The fenestration unit of claim 3, wherein the rocker arm is configured to be manually depressed on an end of the rocker arm located opposite the engagement features to release the transfer mechanism to adjust a position of the slide member along the transfer mechanism.

5. The fenestration unit of claim 2, wherein the rocker arm and clamp member releasably pinch a portion of the drive belt between the rocker arm and the clamp member.

6. The fenestration unit of claim 2, wherein the rocker arm is manually depressible by a user to release the drive belt to permit the slide member to be adjusted along the length of the drive belt.

7. The fenestration unit of claim 1, wherein the handle is arranged to project inwardly toward a center of the fenestration unit.

8. The fenestration unit of claim 1, wherein the handle is arranged to project interiorly away from an interior side of the fenestration unit.

9. The fenestration unit of claim 1, wherein the panel is hinged to the frame such that the panel is pivotable between the open position and the closed position.

10. The fenestration unit of claim 1, wherein the fenestration unit is a casement window.

* * * * *